United States Patent [19]
Ishida et al.

[11] Patent Number: 5,902,375
[45] Date of Patent: May 11, 1999

[54] METHOD OF MELTING TINNED IRON SCRAP

[75] Inventors: Hiroaki Ishida; Yoshiki Ito; Takaiku Yamamoto, all of Osaka, Japan

[73] Assignee: Sumitomo Metal Industries, Ltd., Osaka, Japan

[21] Appl. No.: 08/849,039

[22] PCT Filed: Sep. 27, 1996

[86] PCT No.: PCT/JP96/02835

§ 371 Date: Jun. 16, 1997

§ 102(e) Date: Jun. 16, 1997

[87] PCT Pub. No.: WO97/12065

PCT Pub. Date: Apr. 3, 1997

[30] Foreign Application Priority Data

Sep. 27, 1995 [JP] Japan .................................. 7-249265
Mar. 27, 1996 [JP] Japan .................................. 8-071793

[51] Int. Cl.$^6$ .................................................. C21B 11/02
[52] U.S. Cl. .................................. 75/571; 75/576; 75/581; 75/690; 423/96; 423/618
[58] Field of Search ........................... 75/571, 572, 573, 75/575, 576, 581, 690; 423/96, 618

[56] References Cited

U.S. PATENT DOCUMENTS 5,588,982 12/1996 Hendrix .................................. 75/10.5

FOREIGN PATENT DOCUMENTS

| | | |
|---|---|---|
| 1-290711 | 11/1989 | Japan . |
| 2-282410 | 11/1990 | Japan . |
| 4-198429 | 7/1992 | Japan . |
| 4-198430 | 7/1992 | Japan . |
| 5-9600 | 1/1993 | Japan . |

*Primary Examiner*—Melvyn Andrews
*Attorney, Agent, or Firm*—Burns, Doane, Swecker & Mathis, L.L.P.

[57] ABSTRACT

The method of the invention comprises a method of melting tin-plated iron type scrap using tin-plated iron type scrap of loose packing as a portion of the iron type scrap and conducting melting while controlling the post combustion ratio of the gas by adjusting the amount of the combustion sustaining gas blown from the secondary tuyeres and a method of melting tin-plated iron type scrap packing the tin-plated iron type scrap prior to the non tin-plated iron type scrap and conducting melting while retaining the tin-melted iron type scrap between the coke packed layer and the non tin-plated iron type scrap packed layer. According to the melting method of the tin-plated iron scrap of the present invention, exhaust gas of high heat generation amount can be recovered while producing pig iron with low Sn content usable for the production of high quality steels by one furnace, without adding a preliminary Sn-removing processing step or molten metal mixing step and without using expensive electric power, by one furnace. Further, an exhaust gas dust in which $SnO_2$ is concentrated can be utilized effectively as an Sn source. Accordingly, the method according to the present invention can be utilized in the field of melting market scrap such as surface treated steels.

19 Claims, 8 Drawing Sheets

Fig. 5

| item | | Example 1 of the Invention | | Example 2 of the Invention | | Example 3 of the Invention | | Comparative Example 1 | Comparative Example 2 |
|---|---|---|---|---|---|---|---|---|---|
| | | A | B | A | B | A | B | | |
| U-shaped deformed scrap | (kg/pig iron t) | 634 | - | 634 | - | 634 | - | - | - |
| shredded scrap | (kg/pig iron t) | - | 634 | - | 634 | - | 634 | - | - |
| tinned can pressed scrap | (kg/pig iron t) | - | - | - | - | - | - | 634 | 634 |
| home scrap | (kg/pig iron t) | 316 | 316 | 316 | 316 | 316 | 316 | 316 | 316 |
| burnt lime | (kg/pig iron t) | 16 | 16 | 14 | 14 | 12 | 12 | 16 | 12 |
| silica stone | (kg/pig iron t) | 5 | 5 | 5 | 5 | 4 | 4 | 5 | 4 |
| lump coke | (kg/pig iron t) | 125 | 125 | 98 | 99 | 80 | 80 | 125 | 80 |
| primary tuyere, total | $O_2$ blowing flow rate (Nm³/Hr) | 1000 | 1000 | 1000 | 1000 | 1000 | 1000 | 1000 | 1000 |
| | pneumatical $N_2$ flow rate (Nm³/Hr) | 150 | 150 | 150 | 150 | 150 | 150 | 150 | 150 |
| | pulverized coal flow rate (kg/Hr) | 1200 | 1200 | 1200 | 1200 | 1200 | 1200 | 1200 | 1200 |
| secondary tuyere, total | $O_2$ blowing flow rate (Nm³/Hr) | 0 | 0 | 400 | 400 | 550 | 550 | 0 | 550 |
| | switched $N_2$ blowing flow rate (Nm³/Hr) | 100 | 100 | 100 | 100 | 100 | 100 | 100 | 100 |
| average post combustion rate (%) | | 18 | 18 | 41 | 40 | 55 | 53 | 16 | 50 |

Fig. 6

| item | | | Example 1 of the Invention | | Example 2 of the Invention | | Example 3 of the Invention | | Comparative Example 1 | Comparative Example 2 |
|---|---|---|---|---|---|---|---|---|---|---|
| | | | A | B | A | B | A | B | | |
| pig iron | Sn content | (wt%) | 0.053 | 0.057 | 0.036 | 0.038 | 0.029 | 0.036 | 0.090 | 0.050 |
| Sn removing ratio | (%) ** | | 72 | 70 | 81 | 80 | 85 | 81 | 53 | 74 |
| dust exhaustion amount | $SnO_2$ | (kg/pig iron) | 1.8 | 1.8 | 1.9 | 1.9 | 2.0 | 1.9 | 1.1 | 1.8 |
| | | (wt%) | 18 | 18 | 21 | 21 | 28 | 24 | 9 | 18 |
| | total Fe | (kg/pig iron t) | 0.5 | 0.6 | 0.4 | 0.4 | 0.3 | 0.4 | 0.6 | 0.5 |
| | | (wt%) | 5 | 6 | 5 | 4 | 4 | 5 | 5 | 5 |
| | total C | (kg/pig iron t) | 5.5 | 5.7 | 4.4 | 4.7 | 2.8 | 3.5 | 7.8 | 5.4 |
| | | (wt%) | 55 | 57 | 50 | 51 | 40 | 43 | 65 | 54 |
| | others CaO, etc | (kg/pig iron t) | 2.2 | 1.9 | 2.1 | 2.2 | 2.0 | 2.3 | 2.5 | 2.3 |
| | | (wt%) | 22 | 19 | 24 | 24 | 28 | 28 | 21 | 23 |
| | total dust | (kg/pig iron t) | 10 | 10 | 8.8 | 9.2 | 7.1 | 8.1 | 12 | 10 |
| stoichiometrical $SnO_2$ forming amount (kg/pig iron t)* | | | 1.8 | 1.8 | 1.9 | 1.9 | 2.0 | 1.9 | 1.3 | 1.8 |
| exhaust gas | average post combustion ratio | (%) | 18 | 18 | 41 | 40 | 55 | 53 | 16 | 50 |
| | calorie | (kcal/Nm³) | 2062 | 2065 | 1402 | 1423 | 1008 | 1061 | 2103 | 1164 |
| | average temperature | (°C) | about 300 | about 300 | about 400 | about 400 | about 500 | about 500 | about 300 | about 500 |

(note)
**: Sn removing ratio = (Sn charged weight−Sn weight in produced pig iron)/Sn charged weight × 100(%)
*: Stoichiometrically formed about = (Sn charged amount−Sn weight produced pig iron) × Molecular weight of $SnO_2$/Molecular weight of Sn

Fig. 7

| item | | Example of the invention | | | | Comparative Example | | |
|---|---|---|---|---|---|---|---|---|
| | | 1 | 2 | 3 | 4 | 1 | 2 | 3 |
| Scrap charging order | | Sn-plated steel sheet preceding | | | | non Sn-plated steel sheet preceding | | |
| Sn plated steel sheet scrap | (kg/pig iron t) | 634 | 634 | 634 | 634 | 634 | 634 | 634 |
| non Sn-plated steel sheet scrap | (kg/pig iron t) | 316 | 316 | 316 | 316 | 316 | 316 | 316 |
| total scrap | (kg/pig iron t) | 950 | 950 | 950 | 950 | 950 | 950 | 950 |
| burnt lime | (kg/pig iron t) | 22 | 22 | 15 | 13 | 22 | 15 | 13 |
| silica stone | (kg/pig iron t) | 7 | 7 | 5 | 4 | 7 | 5 | 4 |
| blast furnace coke | (kg/pig iron t) | 270 | 270 | 185 | 155 | 270 | 185 | 155 |
| primary tuyere air flow rate | (Nm³/hr) | 8570 | 7570 | 6570 | 5570 | 7570 | 6570 | 5570 |
| secondary tuyere air flow rate | (Nm³/hr) | 0 | 1000 | 2000 | 3000 | 1000 | 2000 | 3000 |
| total air flow rate | (Nm³/hr) | 8570 | 8570 | 8570 | 8570 | 8570 | 8570 | 8570 |
| average post combustion ratio | % | 15 | 15 | 30 | 45 | 15 | 30 | 45 |

Fig. 8

| item | | | Example of the invention | | | | Comparative Example | | |
|---|---|---|---|---|---|---|---|---|---|
| | | | 1 | 2 | 3 | 4 | 1 | 2 | 3 |
| charged Sn amount: as pig iron | | (wt%) | 0.127 | 0.127 | 0.127 | 0.127 | 0.127 | 0.127 | 0.127 |
| Sn content in pig iron | | (wt%) | 0.056 | 0.038 | 0.032 | 0.028 | 0.085 | 0.083 | 0.076 |
| Sn removing ratio * | | (%) | 56 | 70 | 75 | 78 | 33 | 35 | 40 |
| dust exhaustion amount | SnO$_2$ | (kg/pig iron) | 1.8 | 2.0 | 1.9 | 1.8 | 1.4 | 1.5 | 1.5 |
| | | (wt%) | 14 | 18 | 19 | 20 | 8 | 9 | 10 |
| | total Fe | (kg/pig iron t) | 0.9 | 0.6 | 0.5 | 0.5 | 1.4 | 1.4 | 1.1 |
| | | (wt%) | 6 | 5 | 5 | 5 | 8 | 8 | 7 |
| | total C | (kg/pig iron t) | 8.3 | 6.1 | 5.5 | 5.0 | 11.7 | 10.9 | 9.3 |
| | | (wt%) | 59 | 55 | 53 | 50 | 65 | 64 | 62 |
| | others CaO, etc | (kg/pig iron t) | 3.0 | 2.4 | 2.2 | 2.0 | 3.4 | 3.2 | 3.2 |
| | | (wt%) | 21 | 22 | 23 | 25 | 19 | 19 | 21 |
| | total dust | (kg/pig iron t) | 14 | 11 | 10 | 9 | 18 | 17 | 15 |
| exhaust gas | average post combustion ratio | (%) | 15 | 15 | 30 | 45 | 15 | 30 | 45 |
| | calorie | (kcal/Nm³) | 2140 | 2140 | 1720 | 1295 | 2140 | 1720 | 1295 |
| | average temperature | (°C) | about 300 | about 300 | about 350 | about 400 | about 300 | about 350 | about 400 |

(note)  *: Sn removing ratio = (Sn charged weight − Sn weight in produced pig iron)/Sn charged weight × 100(%)

METHOD OF MELTING TINNED IRON SCRAP

TECHNICAL FIELD

The present invention concerns a method of steel scrap or scrap iron (hereinafter merely referred to as "scrap") melting by using a vertical furnace having tuyeres, and using fossil fuels without using electric power for melting and, more in particular, it relates to a method of tinned iron scrap melting capable of producing molten iron with less tin content that can be used for the production of high quality steels corresponding to converter steels or special steels and capable of recovering tin in a reclaimable manner, by utilizing tin-plated iron scrap of low bulk density (for example, tin-plated steel sheets).

BACKGROUND ART

According to the report of Nippon Gakujutsu Shinkokai, 69th Material Processing Committee, First and Second section Joint Research Meeting (1990, August), generation amount of steel scrap as iron type scrap has increased with accumulation amount of steel materials at a rate of about 1,000,000 tons year by year and it is expected that the generation amount of market scrap (obsolete scrap) will be about 40,000,000 ton/year at the year of 2,000, which amounts to 45% for the production quantity of crude steel.

At present, most of market scrap is melted in electric furnaces. Particularly, in recent years, for making the varied kinds of products and for reducing the cost, a so-called mini-mill method has been adopted in which scrap or direct reduced iron for dilution of impurities are melted in electric furnaces, continuously casted and rolled.

On the other hand, in an integrated steel work, a technique of scrap melting without electric power for melting has been developed in order to cope with the increase of the scrap and to ensure iron sources corresponding to diversification of the production quantity of crude steel in the trend of concentration of blast furnaces.

In recent years, along with the trend of consumption intended for higher quality, market scrap of surface treated steel has increased more and one of them includes tinned iron scrap (referred to "can scrap" as market scrap).

Tin (hereinafter referred as Sn) is an element that can not be removed in the steel making step and if Sn remains by more than about 0.04% in the steel, the hot workability or toughness is reduced, so that several proposals have been made for Sn removing technique upon re-utilizing Sn plated steel sheet scrap as the iron source as described below.

Method A (refer to Japanese Patent Laid-Open Hei 4-198429 and Hei 4-198430)

For removing plated portions on the surface of steel sheets, Sn-plated steel sheet scrap is heated to 300–1200° C. and treated in a sulfurizing atmosphere thereby transforming Sn into SnS and SnS is mechanically separated or evaporated. Then, using a furnace of a top and bottom blowing converter type, slag is formed on an iron bath such that the top blowing oxygen jet is not in direct contact with the iron bath and oxygen is top blown, in which carbon material containing an appropriate amount of S (sulfur) and the Sn-plated steel sheet scrap treated in the sulfurizing atmosphere are continuously charged and melted. Since the S potential at the oxygen blowing point is increased and SnS of a low boiling point (about 1230° C.) is formed, evaporation of Sn preferentially to Fe (iron) is enabled to obtain a molten metal containing less than 0.05% by weight of the Sn content and, subsequently, low Sn molten steel is manufactured by the usual steel making processes.

Method B (refer to Japanese Patent Laid-Open Hei 5-9600)

Using a method of packing coke and scrap or scrap and iron ore in a layerous form into a vertical furnace, blowing a combustion sustaining gas from primary tuyeres and secondary tuyeres to each of packed layers thereby conducting melting and reduction (method disclosed in Japanese Patent Laid-Open Hei 1-290711), producing molten iron of low impurity content in a vertical furnace charged with scrap containing less impurities, producing molten iron of high impurity contents in another vertical furnace charged with scrap of high impurity contents such as can scrap (for example, 0.63 wt % Sn content). Then, molten iron manufactured by the two furnaces are mixed to obtain pig iron, for example, of 0.06 wt % Sn.

Method C (refer to Japanese Patent Laid-Open Hei 7-207313)

In this method, coke and scrap are packed in a layerous manner into a vertical furnace and a combustion sustaining gas is blown from primary tuyeres and secondary tuyeres to conduct melting. Tin-plated steel sheet scrap is used at least as a portion of the scrap, an average post combustion ratio is controlled to 50% or higher by adjusting the blowing amount of the combustion sustaining gas of the secondary tuyeres, thereby removing Sn in the form of $SnO_2$ enriched dusts.

Japanese Patent Laid-Open Hei 5-9600, Hei 1-290711 and Hei 7-207313 are proposed by the present applicant or the present inventor.

By the way, each of the prior art described above has the following problems.

Method A:

It is necessary to provide a processing device in a sulfurizing atmosphere for removing Sn on the surface of scrap and the preliminary processing step is indispensable prior to the melting step. Furthermore, for suppressing evaporation of iron at the oxygen blowing point, slag has to be formed in a considerable amount in order that the top blowing oxygen jet is not in direct contact with the iron bath. In this case, since the absolute amount of FeO in the slag is increased, the iron yield is decreased and, in addition, a problem such as damage to the refractories may be increased. Further, since slag desulfurization is scarcely conducted but, on the contrary, since the molten iron is sulfurized, desulfurization processing is essential.

Method B:

This is a melting method using a vertical furnace having tuyeres, and this is not a regular Sn removing technique but, so to speak, a dilution method by mixing of two molten metals, so that it requires another furnace capable of simultaneous pig iron tapping. Accordingly, it is not efficient in term of installation cost and operation cost. Further, a post combustion ratio and a latent heat of the exhaust gas are not considered.

Method C:

This is a melting method using a vertical furnace having tuyeres and a regular Sn removing method. However, it is necessary to control the blowing amount of the combustion sustaining gas from the secondary tuyeres and control the average post combustion ratio to higher than 50%. Therefore, reducing of the heat generation amount of the exhaust gas is tending to lower the economical merit.

DISCLOSURE OF THE INVENTION

The present invention has been accomplished for overcoming the economical problem in a case of melting starting materials including Sn-plated iron type scrap of low bulk density containing Sn-plated steel sheet scrap, particularly, by using a vertical furnace, among the subject described above. Accordingly, an object of the present invention is to provide a method of melting Sn-plated iron type scrap without controlling the post combustion ratio, that is, without controlling the post combustion higher ratio, capable of improving calorie (latent heat amount) possessed in the exhaust gas and capable of attaining a high Sn removing efficiency.

The present invention has a feature in the following methods (1) and (2) of melting Sn-plated iron type scrap.

(1) A method of melting iron type scrap by using a vertical furnace having an opening for charging materials and for recovery of an exhaust gas to an upper portion of a furnace, primary tuyeres to a furnace bottom and/or lower furnace wall and secondary tuyeres to an upper furnace wall respectively, forming a coke packed layer from the furnace bottom to a level including the primary tuyeres and a packed layer mainly composed of iron type scrap there above to a level including the secondary tuyeres, then blowing a combustion sustaining gas or a combustion sustaining gas and a fuel from the primary tuyeres and a combustion sustaining gas from the secondary tuyeres respectively, wherein the method comprises using tin-plated iron type scrap of loose packing at least as a portion of the iron type scrap, and conducting melting while controlling the post combustion ratio of the gas by adjusting the amount of the combustion sustaining gas blown from the secondary tuyeres. Hereinafter the melting method is simply referred to as "the first melting method".

The coke packed layer comprises coke and required slag formers. "Tin-plated iron type scrap of loose packing (hereinafter referred to loose packing scrap)" means, for example, an assembly of cans made of tin-plated steel sheets deformed into U-shape, L-shape, V-shape or W-shape (hereinafter referred to as U-shaped deformed scrap) and/or shredded products (hereinafter referred to as shredder scrap).

The post combustion ratio is defined by the following equation (1).

Post combustion ratio (%)=($CO_2$ vol %)/(($CO_2$ vol %)+(CO vol %))×100 (1)

where ($CO_2$ vol %) and (CO vol %) show exhaust gas composition at the opening of the furnace.

In the first melting method, it is desirable that the post combustion ratio of the gas is controlled to higher than 10% and to lower than 50%.

(2) A method of melting iron type scrap of using a vertical furnace having an opening for charging materials and an exhaust gas to an upper portion of a furnace and disposing tuyeres to a furnace wall of the lower portion of a furnace and/or furnace bottom respectively, forming a coke packed layer from a furnace bottom to a level including the tuyeres and an iron type scrap packed layer there above, and blowing a combustion sustaining gas from the tuyeres respectively, wherein the method comprises using non tin-plated iron type scrap and tin-plated iron type scrap as the iron type scrap, and charging tin-plated iron type scrap before charging non tin-plated iron type scrap and keeping tin-plated iron type scrap between the coke packed layer and non tin-plated iron type scrap layer. The melting method is hereinafter simply referred to as "the second melting method".

In the second melting method, it is desired that the post combustion ratio of the gas is controlled to higher than 10% and to lower than 50%. For attaining a high post combustion ratio from 30% to 50%, it is desirable to use foundry coke.

Further, as the vertical type furnace used for the secondary melting method, a furnace having secondary tuyeres further to the furnace wall for the upper portion of the furnace is desirably used. In this case, it is preferred that the coke for use in blast furnaces is used.

BRIEF DESCRIPTION OF THE DRAWINGS

FIG. 5 is a view showing test conditions in Example 1 for confirming the effect of the first melting method according to the present invention.

FIG. 6 is a view showing test results in this case.

FIG. 7 is a chart illustrating test conditions in Example 2 for confirming the effect of the second melting method according to the present invention.

FIG. 8 is a view illustrating the test results in this case.

BEST MODE FOR PRACTICING THE INVENTION

I. The First Melting Method

Figure 1:
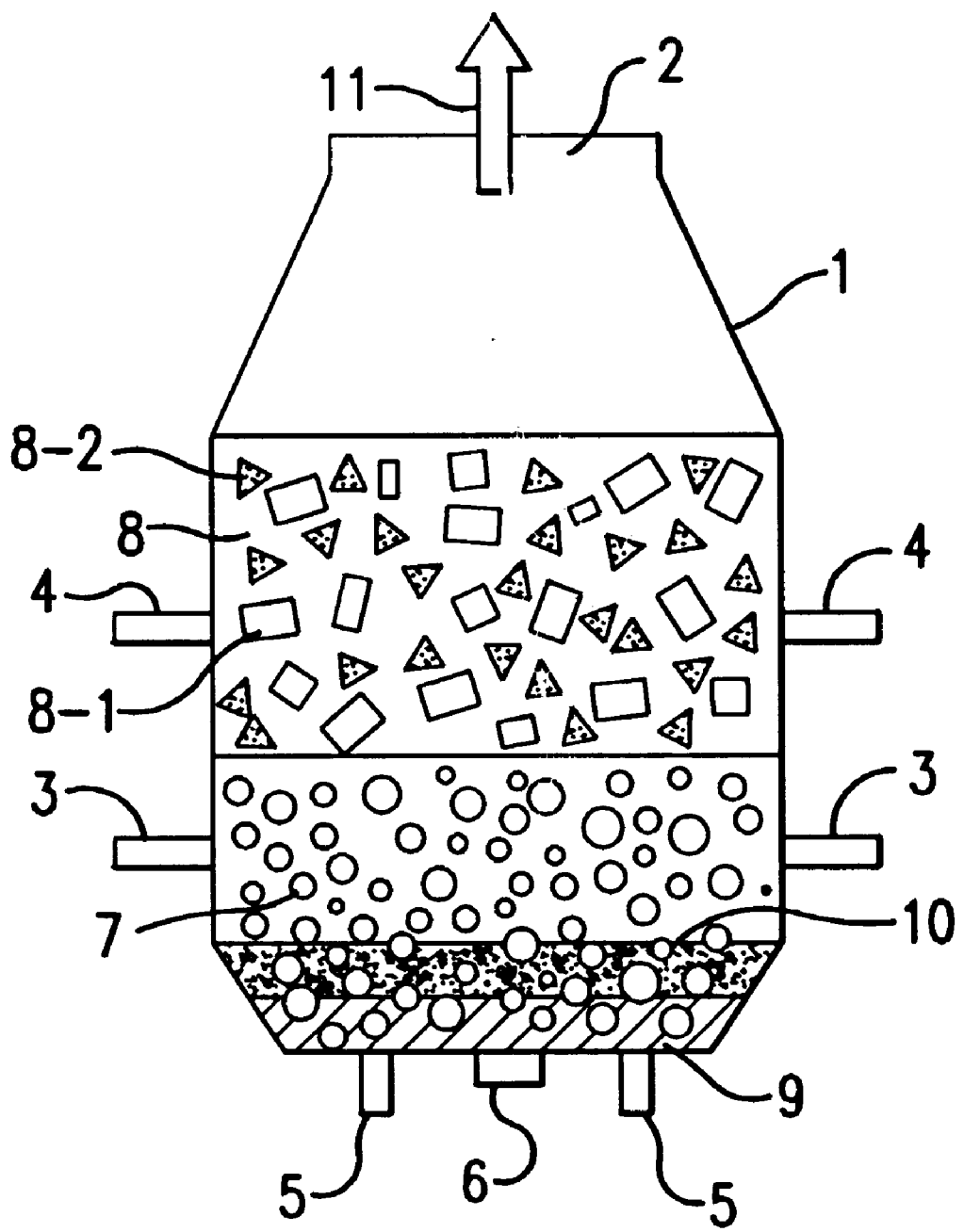
FIG. 1 is a schematic vertical cross sectional view illustrating a vertical furnace used for practicing the first melting method according to the present invention and a state of charges in the furnace.

Explanation is to be made of an constitutional example of a furnace for practicing the first melting method according to the present invention. FIG. 1 is a schematic vertical cross sectional view illustrating a vertical furnace and the state of charges in the furnace.

A vertical furnace 1 has an opening 2 to an upper portion of a furnace for the recovery of an exhaust gas 11 containing dusts and for charging materials. Above the opening 2, are a detachable duct for connection with a dust collector, a gas recovery facility for gases and a heat recovery facility disposed but they may be of a well-known structure and are not shown in the drawing.

Primary tuyeres 3 are arranged to a lower furnace wall of the vertical furnace 1 for blowing a combustion sustaining gas such as $O_2$ containing gas and, if required, liquid or gas fuels such as pulverized coal, heavy oil and natural gas. In the same manner, secondary tuyeres 4 are arranged to an upper furnace wall for blowing a combustion sustaining gas. In the example of FIG. 1, furnace bottom primary tuyeres 5 are further provided for blowing a combustion sustaining gas or a desulfurizing agent such as CaO to the furnace bottom but they are not essential primary tuyeres. That is, the primary tuyeres are arranged to the lower furnace wall and/or furnace bottom. When the primary tuyeres are arranged only at the furnace bottom, the furnace bottom primary tuyere 5 blow the combustion sustaining gas and the combustion sustaining gas and a fuel. If the primary tuyeres are located only at the furnace bottom or the lower furnace wall, it is allowed to blow a desulfurizing agent such as CaO through each of them. A tapping hole 6 is disposed to the furnace bottom for discharging molten iron 9 and slag 10. A desirable arrangement for the tuyeres is as shown below.

The primary tuyeres are provided by four (90° interval in the horizontal direction) to an upper portion about 0.8 m above the furnace bottom in the lower furnace wall, provided each by one on both sides of the tapping hole 6, that is, two in total in the furnace bottom. The secondary tuyeres are disposed by four (90° interval in the horizontal direction) to an upper portion about 1.4 m above the furnace bottom.

For melting the materials containing Sn-plated iron type scrap by using the vertical furnace 1 as described above, coke and required slag formers such as silica, limestone, serpentinite or fluorite are charged up to the level at the lower furnace wall containing the primary tuyere 3 to form a coke packed layer 7. A desirable range for the volume ratio of the coke and the slag former is about 0.01 to 0.3, and a desirable range for the bulk density of the coke packed layer 7 is about from 0.8 to 1.0 t/m$^3$ (0.9 t/m$^3$ in average). A desirable range for the thickness of the coke packed layer 7 is about from 100 to 300 mm.

Then, Sn-plated iron type scrap 8-1 is charged alone or together with low impurity scrap 8-2 such as home scrap and, optionally, with an iron source such as iron ore, up to the level above the coke packed layer including at least the secondary tuyeres 4 of the vertical furnace 1, to form a scrap packed layer 8.

In the first meting method according to the present invention, loose packing scrap is used at least as a portion of scrap in order to ensure gaps in the scrap packed layer 8 thereby improving the contact between the gas and the Sn-plated iron type scrap in the layer.

The loose packing scrap is not conventional can press scrap in the shape formed by press-molding the tinned cans and bundling them in plurality but a mere assembly of "U-shaped deformed scrap" and/or "shredded scrap".

"U-shaped deformed scrap" is a mere assembly of tinned cans individually deformed by using a die into "U-shaped configuration" or "L-shaped configuration". "The shredded scrap" is a mere assembly of tinned cans which are broken by treating the tinned cans to a shredder machine.

The range for the bulk density of the three kinds of scrap is 3.0 to 2.6 t/m$^3$ (2.8 t/m$^3$ in average) for the tinned can press scrap which is reduced to about 60% as 1.4–1.0 t/m$^3$ (1.2 t/m$^3$ in average) in "U-shaped deformed scrap". In the "shredded scrap", the bulk density is from 1.6 to 1.0 t/m$^3$ (1.3 t/m$^3$ in average).

The materials such as loose packing scrap and other low impurity iron scrap such as home scrap are used and packed such that the range for the bulk density of the scrap packed layer 8 is about 1.0 to 2.6 t/m$^3$ (1.8 t/m$^3$ in average). In this case, the ratio of the "U-shaped deformation scrap" in the loose packing layer and "shredded scrap" is optional. Further, if the bulk density of the scrap packed layer 8 can be within the above-mentioned range, the entire amount of the scrap may be comprised only of loose packing scrap as described above.

After packing as described above, the combustion sustaining gas or the like is blown to the coke packed layer 7 from the primary tuyeres 3 at the lower furnace wall and/or from the furnace bottom primary tuyeres 5, to cause a partial combustion reaction of the following equation (2) to generate a CO gas at high temperature and also to keep the coke packed layer 7 at a high temperature.

$$CO+(\tfrac{1}{2})O_2 \rightarrow CO+29,400 \text{ Kcal/Kmol·C} \quad (2)$$

The CO gas generated in the equation (2) reacts in the scrap packed layer 8 with the combustion sustaining gas blown in from the secondary tuyeres 4 to cause post combustion in accordance with the following equation (3). The scrap is heated and melted by the heat of reaction.

$$CO+(\tfrac{1}{2})O_2 \rightarrow CO_2+67,590 \text{ Kcal/Kmol·CO} \quad (3)$$

In this case, the post combustion ratio (refer to equation (1) above) is controlled in the opening 2 by adjusting the flow rate of the sustaining gas blown from the secondary tuyeres 4 (refer to equation (1)). A desired range for the post combustion ratio is from 10% to 50%.

If the post combustion ratio exceeds 50%, the CO ratio in the exhaust gases is reduced and the heat generation amount thereof is lowered, economical merit is reduced. If it is less than 50%, the heat generation amount of the exhaust gas can be increased to compensate for the energy required in the steps from steel making to rolling. On the other hand, if the post combustion ratio is lower than 10%, the melting efficiency, that is, the productivity is lowered and, further, it is difficult to ensure the generation of the $CO_2$ for removing Sn in which Sn-removing ratio is also lowered.

As described above, Sn in the surface layer of the loose packing scrap is discharged out of the furnace and recovered as $SnO_2$ dust together with the exhaust gas and pig iron with less Sn content is produced. Furthermore, the exhaust gas having a high heat generation capacity and a high CO ratio is recovered simultaneously and used as the fuel.

The basic technical idea of the first melting method according to the present invention is to produce pig iron of low Sn content at a reduced cost and to recover the exhaust gas having a high heat generation capacity by oxidizing Sn in the surface layer of the loose packing scrap melted during a low temperature state at the initial stage of temperature elevation process (before Sn drips to the furnace bottom or Sn diffuses into the base metal) and discharging or exhausting them out of the furnace as an $SnO_2$ dust, while controlling the post combustion ratio of the CO gas generated in the lower portion of the furnace.

The Sn removing mechanism in the first melting method according to the present invention is considered to be the followings a–d.

a: CO gas at high temperature generated by the equation (2) above ascends in the coke packed layer and forms a post combustion gas at 1700 to 1900° C. by the post combustion according to the equation (3) in the scrap packed layer.

b: The post combustion gas passes through gap between pieces of the loose packing scrap thereby rapidly heating the loose packing scrap from the surface to the inside, while the gas ascends in the scrap packed layer with the temperature of the gas itself being lowered. Then, heat exchange is conducted with the coke packed layer and the scrap packed layer which is used for the next melting process is charged continuously and then the gas is discharged at an exhaust gas temperature of 200 to 500° C. from the opening.

c: The loose packing scrap charged in the furnace as cold material rapidly start temperature elevation from the surface with the temperature elevation rate varying depending on the position in the scrap packed layer. Then, when the temperature at the surface layer of the loose packing scrap reaches 232° C. (melting point of Sn), the Sn plated layer (usually at a thickness of about 40×10$^{-6}$ m) is melted instantly, oxidized by a $CO_2$ gas in the post combustion gas that passes through the loose packing scrap and a thin solid phase $SnO_2$ layer is formed in a state that is being peeled from the joined surface between the plating layer and the base metal. Accordingly, Sn is not concentrated in the produced pig iron by the dripping of Sn melted in the initial stage of the temperature elevation through the packed layer and hot accumulated on the furnace bottom or by the diffusion of Sn into the base metal.

d: The thin solid phase $SnO_2$ surface layer which is peeled off the base metal is heated by the post combustion gas at a high temperature described above that ascends while passing through the gaps in the scrap packed layer and its temperature is elevated preferentially to the temperature elevation of the base metal. A portion of $SnO_2$ finely powderized in the step of the temperature elevation ascends accompanying the ascending stream of the post combustion gas and is discharged as an exhaust gas dust from the opening to the outside of the furnace. The thin $SnO_2$ layer remaining on the surface of the base metal is heated to temperature near the temperatures at which the post combustion gas is formed before the steel material as the base metal is melted. Since $SnO_2$ sublimates without melting at a temperature higher than 1800° C., $SnO_2$ vapors ascend passing through the gaps in the scrap packed layer, and are cooled in the step of ascending into a fine exhaust gas dust and discharged out of the furnace.

The present inventors have found that the Sn removing mechanism described above undergoes the effect of the gaps in the scrap packed layer. That is, it has been found experimentally that improvement of the state of contact between the gas and the surface of the Sn plated iron type scrap is a most necessary factor to the removal of Sn and there is no requirement for generating the post combustion gas containing $CO_2$ at a high concentration.

Figure 4:
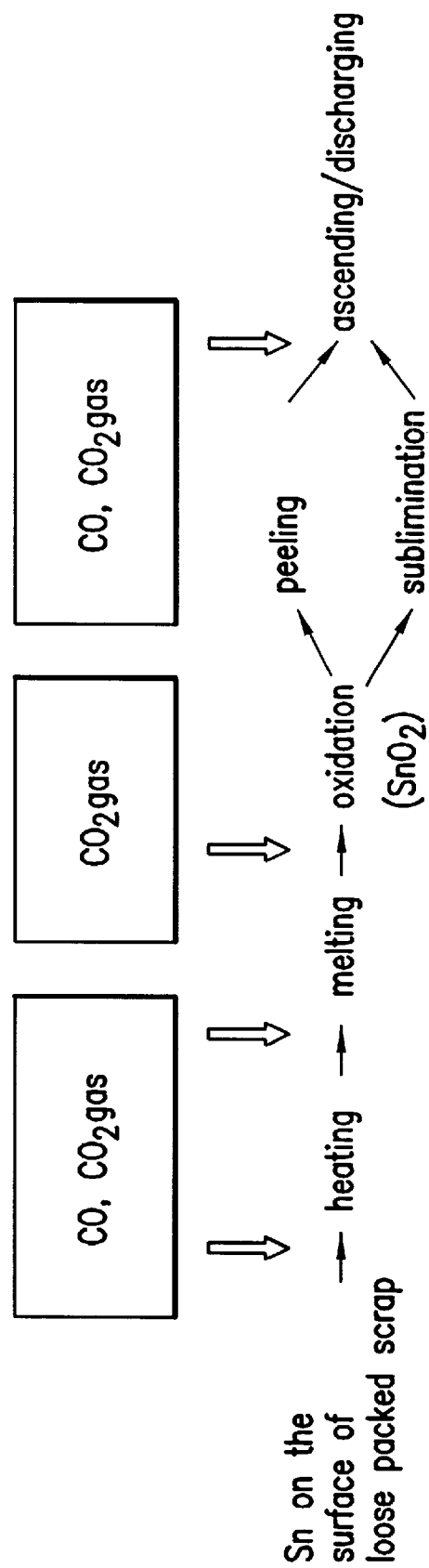
FIG. 4 is a view for explaining a Sn-removing flow in a vertical furnace used for practicing the first melting method of the present invention.

FIG. 4 is a view for illustrating an Sn removing flow in the first melting method according to the present invention. As illustrated in the figure, generated CO gas and $CO_2$ gas are in contact with the surface of Sn-plated steel sheet scrap in each of the steps of heating and melting of the scrap, oxidation of Sn and peeling and sublimation of $SnO_2$. A portion of $SnO_2$ ascends accompanying the ascending stream of the post combustion gas, and is discharged from the opening out of the furnace as the exhaust gas dust.

That is, if the bulk density of the scrap packed layer is kept within a appropriate range to increase gaps and to make the area of contact larger between the surface of the Sn plated steel sheet scrap and the gas, heating, melting, oxidation and ascending and discharge of $SnO_2$ accompanying the exhaust gas are promoted in the Sn removing flow shown in FIG. 4.

As a result of the investigation made by the present inventors on "U-shaped deformed scrap" sampled from the scrap packed layer in the furnace while interrupting the melting operation, it has been demonstrated that since the scrap still maintained the uneven shape nearly equal with the states before charging such as "U-shape" or "L-shape" and because the surface exhibits red brown color, the area of contact with the gases was large.

Accordingly, in the first melting method of the present invention, the loose packing scrap described above were used at least as a portion of the scrap, and melted while controlling the post combustion ratio by adjusting the amount of the combustion sustaining gas blown from the secondary tuyere disposed to the upper furnace walls.

In the first melting method according to the present invention, the Sn-coating layer on the surface of the Sn-plated iron type scrap can be transformed into $SnO_2$ and removed by discharging out of the furnace, based on the mechanisms and the function and effect described above. Accordingly, it is possible to recover the exhaust gas of high heat generation amount while producing pig iron with low Sn content usable for the production of high quality steels, by one furnace with no addition of the preliminary processing step for removal of Sn or the molten metal mixing step, and without using expensive electric power.

II. The Second Melting Method

Explanations will be made to a constitutional example of a vertical furnace for practicing the second melting method according to the present invention.

Figure 2:
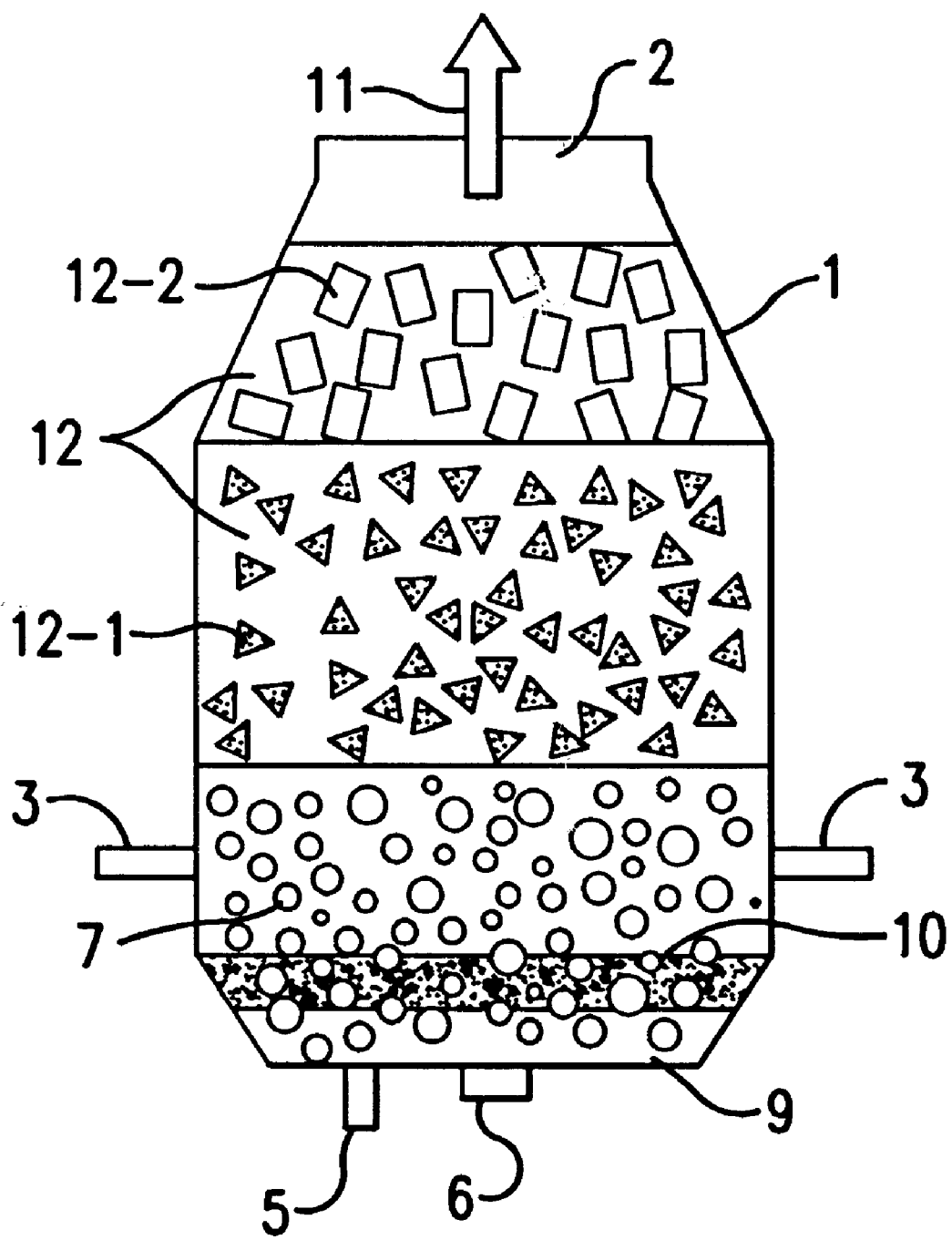
FIG. 2 is a schematic vertical cross sectional view illustrating a vertical furnace used for practicing the second melting method according to the present invention and a state of charges in the furnace.

FIG. 2 is a schematic vertical cross sectional view illustrating a vertical furnace having no secondary tuyere and the state of charges in the furnace.

As shown in the figure, the vertical furnace 1 has an opening 2 disposed to an upper portion for discharging dusts containing exhaust gas 11 and for charging materials. Above the vertical furnace 1, are a duct detachable to an opening 2 for connection with a dust collector or an exhaust gas heat recovery facility disposed, but they are not shown in the drawing like that in FIG. 1 as described previously.

Tuyeres 3 and/or furnace bottom tuyeres 5 are disposed to the furnace wall for the lower portion of the furnace or, further, to the furnace bottom of the vertical furnace 1 for blowing a combustion sustaining gas such as an oxygen containing gas and, as required, liquid or gas fuels such as pulverized coal, petroleum, natural gas or the like. A tapping hole 6 is disposed to the furnace bottom for discharging pig iron 9 and slag 10.

A desirable arrangement for the tuyeres are such that tuyeres 3 for the furnace wall for the lower portion of the furnace are disposed by four (90° interval in the horizontal direction) about 0.8 m above the furnace bottom and the furnace bottom tuyeres 5 are disposed by four (90° interval in the horizontal direction) at a position 0.4 m from the center.

For melting the Sn-plated iron type scrap by using the vertical furnace 1 shown in FIG. 2, coke, preferably, foundry coke, as well as necessary slag formers such as silica, limestone, serpentinite and fluorite are at first charged into the vertical furnace 1 to form a coke packed layer 7 up to a level including the tuyeres 3 at the furnace wall in the lower portion of the furnace. Then, the Sn-plated iron type scrap 12-1 is charged at first to a level about 2.4 m from the furnace bottom and, subsequently, not Sn-plated iron type scrap 12-2 is charged to form a scrap packed layer 12 up to the level about 3.4 m from the furnace bottom. In this way, the Sn-plated iron type scrap 12-1 is retained between the coke packed layer and the packed layer of the non Sn-plated iron type scrap 12-2.

The foundry coke is coke for the production of the foundry. Since this is relatively large in the size and has high density, the coke is of low combustibility. A desired range for the grain size is about from 100 to 200 mm and a desired range for the bulk density is about from 0.5 to 0.8 $t/m^3$.

A desired range for the volume ratio between the foundry coke and the slag former is about from 0.02 to 0.2 and a desired range for the bulk density of the coke packed layer 7 is about from 0.7 to 1.2 $t/m^3$ (0.9 $t/m^3$ in average). The not Sn-plated iron type scrap is low Sn scrap having the Sn contents in the scrap of less than 0.01% by weight. For example, most scrap other than tinned can scrap corresponds to the low Sn scrap. The Sn-plated iron type scrap is high Sn scrap having Sn content in the scrap of more than 0.1 wt %, which corresponds to so-called tinned can scrap. Since the two kinds of the iron type scrap is an assembly of various kinds of iron scrap, the range for the bulk density varies about from 1 to 3 $t/m^3$ (2 $t/m^3$ in average).

After charging to the vertical furnace 1 as described above, a combustion sustaining gas is blown to the coke packed layer 7 from the tuyeres 3 or from the tuyeres 3 and the furnace bottom tuyeres 5 to cause complete combustion reaction in accordance with the following equation (4) and the coke packed layer 9 is kept at a high temperature.

The $CO_2$ at high temperature formed in accordance with the equation (4) causes the carbon solution reaction of the following formula (5) with the surrounding coke:

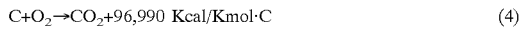

$$C+O_2 \rightarrow CO_2+96,990 \text{ Kcal/Kmol·C} \quad (4)$$

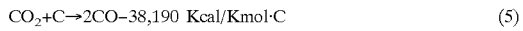

$$CO_2+C \rightarrow 2CO-38,190 \text{ Kcal/Kmol·C} \quad (5)$$

A preferred combustion sustaining gas is air or oxygen enriched air and a desired range for the flow rate thereof is about from 1,000 to 10,000 $Nm^3/hr$.

The proceeding degree of the reaction shown by the formula (5) varies depending on the nature of the coke. For instance, in a case if the combustion performance is low as in the foundry coke having a relatively large size and high density, the carbon solution reaction of the formula (5) is slow and the reaction amount is small. Accordingly, the range for the post combustion ratio shown by the formula (1) is 30 to 50%.

In the second melting method according to the present invention, a vertical furnace further provided with secondary tuyeres may also be used. This is to be explained with reference to FIG. 3.

Figure 3:
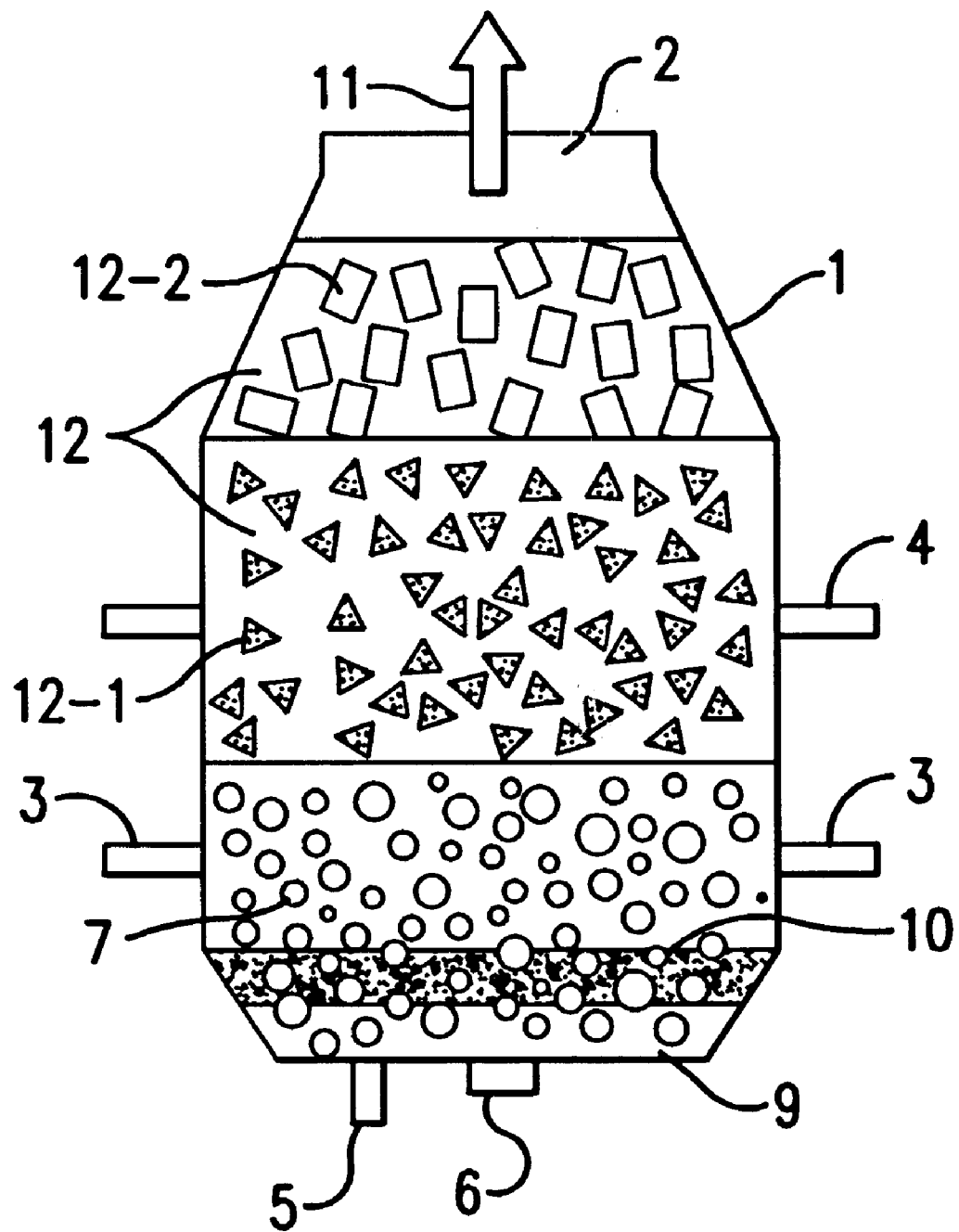
FIG. 3 is a schematic vertical cross sectional view of a furnace having secondary tuyeres to a furnace wall in an upper portion of a furnace and a state of charges in the furnace as another example of a vertical furnace used for practicing the second melting method.

FIG. 3 is a schematic vertical cross sectional view illustrating a vertical furnace further having secondary tuyeres and the state of the charges in the furnace. In FIG. 3, the tuyere 3 shown in FIG. 2 is shown as a primary tuyere 3, while the reactor bottom tuyere 5 is shown as a furnace bottom primary tuyere 5. Further, a desired arrangement for the secondary tuyeres 4 is such that they are disposed by six (60° interval in horizontal direction) in the furnace wall for the upper portion of the furnace about 1.4 m higher than the furnace bottom.

For melting the Sn-plated iron type scrap by using the vertical furnace 1 shown in FIG. 3, a coke packed layer 7 is at first formed preferably by using blast furnace coke, to form a coke packed layer 7 up to a level including the primary tuyere 3 like that in FIG. 2 using blast furnace coke. Then, like that in FIG. 2, Sn-plated iron type scrap 12-1 is charged and, subsequently, not Sn-plated steel scrap 12-2 is charged to form a scrap packed layer 12.

The blast furnace coke is coke for the production of pig iron in a blast furnace. Since this is smaller in size and poor in density compared with that for the foundry coke, the coke is of high combustion performance. A desired range for the grain size is about from 20 to 70 mm, while a desired range for the bulk density is about from 0.5 to 0.6 $t/m^3$.

A desired range of the volume ratio between the blast furnace coke and the slag former is about from 0.03 to 0.3, a desired range for the bulk density of the coke packed layer 7 is about from 0.6 to 1.0 $t/m^3$ (0.8 $t/m^3$ in average) and a desired range for the layer thickness is about from 100 to 500 mm.

When the blast furnace coke is used as the fuel for melting, after charging to the vertical furnace 1 as described above, the combustion sustaining gas is blown from the primary tuyeres 3, 5 and a combustion sustaining gas is blown to the coke packed layer 7 from the secondary tuyeres 4, to cause a complete combustion reaction of the formula (4) and to keep the coke packed layer 7 at a high temperature. The $CO_2$ gas at high temperature formed according to the formula (4) causes a carbon solution reaction of the formula (5).

In a case where the combustion performance is high, since the size is relatively small and the density is poor as the blast furnace coke, the carbon solution reaction of the formula (5) proceeds rapidly and the reaction amount is large. Accordingly, when the blast furnace coke is used, since the post combustion ratio of the exhaust gas 11 is lowered, it is necessary that a combustion sustaining gas is blown in from the secondary tuyeres 4 and the flow rate is controlled to cause the post combustion reaction of the formula (3) and to control the post combustion ratio within a desired range from 10% to 50%. In this way, the scrap packed layer 12 is heated and melted.

A desired range for the flow rate of the combustion sustaining gas is about 1,000 to 10,000 $Nm^3/hr$ for the primary tuyeres and about 500 to 5,000 $Nm^3/hr$ for the secondary tuyeres.

If the post combustion ratio is more than 50%, since the CO ratio in the exhaust gas, that is, the calorie is lowered, the economical merit is decreased. If the post combustion ratio is from 10 to 50%, the energy required in the steps from the steel making to rolling can be ensured. On the other hand, if the post combustion ratio is less than 10%, it is difficult to ensure the generation of $CO_2$ for the removal of Sn and the Sn removing ratio is lowered. Further, since the melting efficiency of the scrap, that is, the productivity is lowered, the economical merit is reduced.

When continuous melting is conducted in the second melting method according to the present invention, the level of the packed layer is successively measured. The Sn-plated iron type scrap for melting in the succeeding step is previously packed, if the level is lowered and then the not Sn-plated steel scrap may be packed.

The basic technical idea for the second melting method according to the present invention is identical with the case of the first melting method as described above. That is, the post combustion ratio of the CO gas generated in the furnace is desirably controlled within a range described above. Simultaneously, in the heating process for the Sn-plated iron type scrap, Sn present in the plating layer on the surface of the scrap and melted at low temperature (melting point: 232° C.) is oxidized and discharged as the $SnO_2$ gas out of the furnace, before dripping to the furnace bottom or diffusion to the base metal of the steel sheets, whereby pig iron with low Sn content is produced at a reduced cost and exhaust gas at a high calorie is recovered.

Accordingly, the Sn removing mechanism in the second melting method according to the present invention can also be explained by way of the Sn removing mechanism a–d in the first melting method described above. However, such Sn removing mechanism undergoes the effect of the temperature elevation rate at the surface layer of the Sn-plated iron type scrap in the scrap packed layer. That is, it is one of most necessary factors for the removal of Sn to rapidly heat the surface layer of the Sn-plated iron type scrap by the post combustion gas at a high temperature and it is not efficient in the removal of Sn to control the post combustion ratio as high as possible and generate the post combustion gas containing $CO_2$ at a high concentration as in the prior art. Accordingly, it is important to heat the surface of the Sn-plated steel sheet scrap as rapidly as possible before diffusion of Sn into the base metal and, subsequently, to oxidize Sn as rapidly as possible by $CO_2$ gas thereby peeling the thin solid $SnO_2$ layer from the base metal.

As in the second melting method of the present invention, when the scrap is charged in the order of Sn-plated iron type scrap and then the not Sn-plated iron type scrap, the Sn-plated iron type scrap positioned at lower level are heated more rapidly as compared with the not Sn-plated iron type scrap and the temperature elevation rate thereof is increased. Further, when the not Sn-plated iron type scrap is charged from above the furnace, it is also possible to obtain an effect of peeling the thin solid phase $SnO_2$ layer on the surface of the Sn-plated iron type scrap by effectively utilizing the impact force thereof.

Since the thin $SnO_2$ layer remained on the surface of the base metal of the scrap sublimates without melting at a temperature higher than 1800° C., for promoting Sn removal, it is important for the operation of rapidly cooling $SnO_2$ vapor and exhausting them as fine dust together with the exhaust gas out of the furnace. In the order of charging the scrap adopted in the second melting method according to the present invention, since scrap can be heated and melted in a state where the not Sn-plated iron type scrap is present in the upper portion of the furnace, while the Sn-plated iron type scrap is retained between the coke packed layer and the not Sn-plated iron type scrap packed layer, an effect of rapidly cooling $SnO_2$ vapor can be obtained.

Based on the reasons described above, in the second melting method according to the present invention, the Sn-plated iron type scrap is at first packed prior to the charging of the not Sn-plated iron type scrap. Therefore, in the second melting method according to the present invention, like that in the first melting method, the Sn on the surface of the Sn-plated iron type scrap can be transformed into $SnO_2$ based on the Sn removing mechanism and the effect as described above, and they can be removed by being discharged out of the furnace. Accordingly, the exhaust gas at high calorie can be recovered while producing pig iron with low Sn content which is usable for the production of high quality steels using, only one furnace, with no addition of preliminary Sn removing processing or a step of mixing molten metals and without using expensive electric power.

III. Example

The effects of the first melting method and the second melting method according to the present invention will be explained based on Example 1 and Example 2.

EXAMPLE 1

In order to confirm the effect of the first melting method according to the present invention, a continuous production test for pig iron was practiced by using a vertical furnace of the device constitution shown in FIG. 1 (diameter: 1.5 m, height from the furnace bottom to the furnace opening: 3.6 m, inner volume: 6.0 m³), while changing the scrap blending conditions and the average post combustion ratio, and Sn removing ratio, heat generation amount of the exhaust gas and the exhaustion amount of the dust, were investigated.

The positions for the tuyeres were as below.

Primary tuyere (lower furnace wall): Four, 0.8 m above the furnace bottom (90° interval in the horizontal direction).

Primary tuyere (furnace bottom): Each one on both sides of the tapping hole.

Secondary tuyere: Four, 1.4 m above the furnace bottom (90° interval in horizontal direction)

The secondary tuyeres were adapted such that the combustion sustaining gas and $N_2$ gas can be blown alternately. The iron sources used were as follows.

Home scrap (iron purity 99%): Maximum size, 400 mm square, bulk density, 3.5 t/m³, not containing Sn.

Loose packing scrap: "U-shaped deformed scrap" and "shredded scrap" with Sn content of 0.30% by weight.

Tinned can pressed scrap: Sn content of 0.30% by weight.

$O_2$ was used as the combustion sustaining gas, lumps of 20 to 70 mm grain size were used for the coke, and pulverized coal more than 80 wt % of which was 200 mesh sieve or smaller. The following Table 1 shows the compositions for coke and pulverized coal. Further, the operation conditions used in this case are shown in FIG. 5.

TABLE 1

| Section | (wt %) | | | | | | | |
|---|---|---|---|---|---|---|---|---|
| | C | H | O | $SiO_2$ | $Al_2O_3$ | CaO | MgO | Moisture |
| coke | 88.0 | 0.5 | 0.0 | 6.9 | 3.5 | 0.3 | 0.3 | 2.0 |
| Pulverized coal | 75.0 | 4.3 | 8.0 | 7.6 | 3.8 | 0.3 | 0.3 | 2.0 |

EXAMPLE 1 OF THE INVENTION

In accordance with blending conditions shown in FIG. 5, after charging materials in the packed layer structure as shown in FIG. 1, $O_2$ was not blown from the secondary tuyeres. $O_2$ was blown at 800 Nm³/hr from the primary tuyeres in a lower furnace wall, and $O_2$ was blown at 200 Nm³/hr from the primary tuyeres at the furnace bottom and, further, pulverized coal of 1,200 kg/hr was pneumatically fed together with $N_2$ at 150 Nm³/hr from the primary tuyeres in the lower furnace walls into the coke packed layer so as to set the average post combustion ratio to 18%.

In this case, in order to prevent choking in the secondary tuyeres, a minimum amount of $N_2$ gas was blown from the secondary tuyeres as shown by the operation conditions in FIG. 5.

As the melting proceeded and the height of the scrap packed layer descended, coke and scrap to be used for the next continuous melting was charged to form a packed layer. In this way, pig iron at 7.5 ton of tapping amount was produced continuously.

EXAMPLE 2 OF THE INVENTION

In accordance with the blending condition shown in FIG. 5, after charging the material of the packed layer structure as shown in FIG. 1, the same blowing conditions for the primary tuyeres as in the Example 1 of the invention were set and $O_2$ at 400 Nm³/hr was blown from the secondary tuyeres into the coke packed layer such that the average post combustion ratio was 41% or 40%.

As the melting proceeded and the height of the scrap packed layer descended, coke and scrap to be used for the succeeding continuous melting was charged to form a packed layer. In this case, since coke was present but scrap was not present in front of the secondary tuyeres, $O_2$ blowing was switched to $N_2$ gas blowing at the minimum amount as shown in operation conditions in FIG. 5. In this way, pig iron at 7.5 ton of tapping amount was produced continuously.

EXAMPLE 3 OF THE INVENTION

In accordance with the blending condition shown in FIG. 5, after charging the material of the packed layer structure as shown in FIG. 1, the same blowing conditions for the primary tuyere were set as in Examples 1 and 2, and $O_2$ at 550 Nm³/hr was blown from the secondary tuyeres to the coke packed layer such that the average post combustion ratio was 55% or 53%.

As the melting proceeded and the height of the scrap packed layer descended, coke and scrap to be used for the succeeding continuous melting were charged to form a packed layer. In this case, since coke was present but scrap was not present in front of the secondary tuyeres, $O_2$ blowing was switched to $N_2$ gas blowing at the minimum amount as shown in operation conditions in FIG. 5 to finish melting. In this way, pig iron at 7.5 ton of tapping amount was produced continuously.

COMPARATIVE EXAMPLE 1

In accordance with the blending conditions shown in FIG. 5, and the other conditions were made substantially identical with those in Example 1.

COMPARATIVE EXAMPLE 2

In accordance with the blending conditions shown in FIG. 5, and other conditions were made substantially identical with those in Comparative Example 1.

FIG. 6 shows test results in Example 1. The Sn removing ratio shown in FIG. 6 is a value determined according to the following equation (note) in the figure by using a calculated Sn weight in the charged iron source (charged Sn weight) and the Sn weight in the produced pig iron calculated from the Sn content and the pig iron tapping amount in the produced molten iron shown in FIG. 6.

As shown in FIG. 6, the Sn removing ratio amounted to 72% or 70% in Example 1 of the invention, 81% or 80% in Example 2 of the invention and 85% or 81% in Example 3 of the invention, which was improved by about 20 to 30% compared with 53% in Comparative Example 1.

In Example 1 of the invention, the Sn removing ratio was high, and the heat generation amount of the exhaust gas had no substantial difference compared with that of the case of Comparative Example 1 having substantially identical post combustion ratio. Further, in Example 1 of the invention, the Sn removing ratio was substantially equal compared with Comparative Example 2 but the heat generation amount of the exhaust gas was as high as nearly about 1.8 times. In the case of Example 2 of the invention, since the Sn removing ratio was high compared with Comparative Example 2 and the post combustion ratio was about 40%, the heat generation amount of the exhaust gas was also high. In the case of Example 3 of the invention, the Sn removing ratio was high but, since the post combustion ratio exceeded 50%, the heat generation amount of the exhaust gas was lower than Comparative Example 1. However, the heat generation amount of the exhaust gas was substantially equal to Comparative Example 2.

In Comparative Example 1, although the heat generation amount of the exhaust gas could be increased, the Sn removing ratio could not be increased. In Comparative Example 2, although the Sn removing ratio could be increased, the heat generation amount of the exhaust gas could not be increased.

As described above, the first melting method according to the present invention can recover the exhaust gas of high heat generation amount under the same conditions for the Sn removing ratio and it is apparent that the method has an economical advantage.

EXAMPLE 2

In order to confirm the effect of the second melting method according to the present invention, a continuous production test for pig iron was practiced and investigated using a vertical furnace of the device constitution shown in FIG. 3, while changing the scrap blending conditions and the average post combustion ratio, and Sn removing ratio, exhaust gas calorie and the exhaustion amount of dust. In this case, the effect for the case of using only the primary tuyeres (Example 1) and the case of further using secondary tuyeres (Examples 2–4) are confirmed.

Vertical furnace:Diameter 1.5 m
  Height from the furnace bottom to the furnace opening, 3.6 m
  Inner volume, 6.0 m$^3$
Tuyere arrangement: Primary tuyeres by four, 0.8 m above the furnace bottom
  (90° interval in the horizontal direction)
  Secondary tuyeres by six, 1.4 m above the furnace bottom
  (60° interval in the horizontal direction)
  The iron source used was the iron type scrap as below.
Not Sn-plated steel scrap: steel scrap of Maximum size: 400 mm square, bulk density: 2.5 t/m$^3$, Sn content, 0.001 wt %
Sn-plated steel scrap: tin-plated can scrap of Maximum size: 150 mm square, bulk density: 1.5 t/m$^3$, Sn content: 0.20 wt %

Air was used as the combustion sustaining gas, blast furnace coke lumps of 20 to 70 mm grain size were used as the coke. The following Table 2 show the composition for coke and the operation conditions used in this case are shown in FIG. 7.

TABLE 2

| | (wt %) | | | | | | | |
|---|---|---|---|---|---|---|---|---|
| Section | C | H | O | SiO$_2$ | Al$_2$O$_3$ | CaO | MgO | Moisture |
| coke | 88.0 | 0.5 | 0.0 | 6.9 | 3.5 | 0.3 | 0.3 | 2.0 |

EXAMPLE 1 OF THE INVENTION

In accordance with blending conditions shown in FIG. 7, materials were charged for the packed layer structure as shown in FIG. 3. The two kinds of the scrap were charged in the order of first, the Sn-plated steel sheet scrap and then the not Sn-plated steel scrap. Then, melting was conducted by blowing air from the primary tuyeres such that the average post combustion ratio was 15%. However, air was not blown from the secondary tuyeres. Since the post combustion reaction as shown in the formula (3) has not taken place by the blowing only from the primary tuyeres, the post combustion ratio can not usually be increased. However, the average post combustion ratio can be made to 15% not because of the carbon solution reaction shown by formula (5) which proceeds completely before the primary tuyeres but because of the CO$_2$ gas generated in the formula (4) in the furnace.

As the melting proceeded and the height of the scrap packed layer descended, coke and scrap to be used for the next continuous melting were charged to form a packed layer. In this way, pig iron at 7.5 ton of tapping amount was produced continuously.

EXAMPLE 2 OF THE INVENTION

In accordance with blending conditions shown in FIG. 7, materials were charged for the packed layer structure as shown in FIG. 3. The two kinds of the scrap were charged in the order of first, the Sn-plated steel sheet scrap and then the not Sn-plated steel scrap like that in Example 1 of the invention. Then, melting was conducted by blowing air further from the secondary tuyeres in addition to the primary tuyeres such that the average post combustion ratio was 15%. As the melting proceeded and the height of the scrap packed layer descended, coke and scrap to be used for the next continuous melting were charged to form a packed layer. In this way, pig iron at 7.5 ton of tapping amount was produced continuously.

EXAMPLE 3 OF THE INVENTION

In accordance with blending conditions shown in FIG. 7 like that in Example 2 of the invention, materials were charged for the packed layer structure as shown in FIG. 3. The two kinds of the scrap were charged in the order of first, the Sn-plated steel sheet scrap and then the not Sn-plated steel scrap like that in Example 1 of the invention. Then, melting was conducted by adjusting the air flow rate from the secondary tuyeres such that the average post combustion ratio was 30%. Subsequently, continuous packing and melting were conducted like that in Examples 1 and 2 of the invention and to produce pig iron at a tapping amount of 7.5 tons.

EXAMPLE 4 OF THE INVENTION

In accordance with blending conditions shown in FIG. 7 like that in Example 2 of the invention, materials were charged for the packed layer structure as shown in FIG. 3 and then melting was conducted by adjusting the air flow rate from the secondary tuyeres such that the average post combustion ratio was 45%. Subsequently, continuous packing and melting were conducted like that in Examples 1 and 2 of the invention to produce pig iron at a tapping amount of 7.5 tons.

COMPARATIVE EXAMPLE 1

In accordance with the blending conditions shown in FIG. 7, materials were charged by changing the order different from the packed layer structure shown in FIG. 3. That is, the two kinds of scrap were charged in the order of first, the not Sn-plated steel scrap and then the Sn-plated steel sheet scrap. Then, melting was conducted by blowing air further from the secondary tuyeres in addition to the primary tuyeres such that the average post combustion ratio was 15%. As the melting proceeded and the height of the scrap packed layer was lowered, coke and scrap to be used for the next continuous melting were charged to form a packed layer. In this way, pig iron at 7.5 ton of tapping amount was produced continuously.

COMPARATIVE EXAMPLE 2

In accordance with the blending conditions shown in FIG. 7, the two kinds of scrap were charged in the same order as in Comparative Example 1. Then, melting was conducted by blowing air from the secondary tuyeres such that the average post combustion ratio was 30%. Subsequently, continuous packing and melting were conducted in the same manner as in Comparative Example 1 to produce pig iron at a tapping amount of 7.5 ton.

COMPARATIVE EXAMPLE 3

In accordance with the blending conditions shown in FIG. 7, the two kinds of scrap were charged in the same order as in Comparative Examples 1 and 2. Then, melting was conducted by blowing air from the secondary tuyeres such that the average post combustion ratio was 45%. Subsequently, continuous packing and melting were conducted in the same manner as in Comparative Examples 1 and 2 to produce pig iron at a tapping amount of 7.5 ton.

FIG. 8 shows the test results in Example 2 like that of the test results in Example 1, the Sn-removing ratio shown in FIG. 8 is a value determined by the following formula (note) in the figure by using the calculated Sn weight in the charged iron source (charged Sn weight) and the Sn weight in the produced pig iron calculated from the Sn content in the produced pig iron and the tapping amount shown in Table 3.

As shown in FIG. 8, referring to Sn removing ratio, it is 56% in Example 1 of the invention which is improved as compared with Comparative Examples 1, 2 and 3 but it is a value lower than Examples 2, 3 and 4 of the invention. Further, in Examples 2, 3 and 4 of the invention, it reaches 70, 75 and 78% respectively which are improvements of about twice compared with 33, 35 and 40% of Comparative Examples 1, 2 and 3. In addition, in Examples 2, 3 and 4 of the invention, the Sn content in the pig iron could be reduced to 0.04% by weight, that is, to such an extent as not giving an undesired effect on the quality of the steel material.

The exhaust gas calorie is a high calorie higher than 1,200 Kcal/Nm$^3$, irrespective of high Sn removing ratio in each of the examples of the invention. On the other hand, as in the result of the comparative examples, in a case of obtaining an exhaust gas of high calorie higher than 1,200 Kcal/Nm$^3$ in the conventional method, only the Sn removing ratio of less than 40% could be attained.

Further, according to the method of Japanese Patent Laid-Open Hei 7-207313 (the method C), it was necessary to set the average post combustion ratio to 72% in order to attain 79% of the Sn removing ratio. Since the calorie of the exhaust gas, when calculated, is utmost 530 Kcal/Nm$^3$, the exhaust gas calorie is less than one-half compared with Example 3 of the invention capable of obtaining the same extent of Sn removing ratio.

As described above, since the method according to the present invention can recover the exhaust gas of high calorie under the condition of high Sn removing ratio, it has a high economical advantage.

INDUSTRIAL APPLICABILITY

According to the method of the present invention, an exhaust gas of high heat generation can be recovered while producing pig iron with low Sn content that can be used for the production of high quality steels by one furnace without adding preliminary Sn removing processing step or molten metal mixing step and without using expensive electric power. Further, the exhaust gas dust in which $SnO_2$ is concentrated can be utilized effectively as an Sn source. Accordingly, the method of melting the tin-plated iron type scrap according to the present invention can be utilized in the field of melting market scrap such as surface treated steels.

We claim:

1. A method of melting tin-plated iron scrap using a vertical furnace having an opening in an upper portion of the furnace for charging materials and for recovery of an exhaust gas, primary tuyeres in a furnace bottom and/or a lower furnace wall and secondary tuyeres in an upper furnace wall, comprising:

forming a coke packed layer from the furnace bottom to a level including the primary tuyeres and a packed layer mainly composed of iron scrap thereabove to a level including the secondary tuyeres, at least a portion of the packed layer of iron scrap comprising tin-plated scrap of loose packing;

blowing a combustion sustaining gas or a combustion sustaining gas and a fuel from the primary tuyeres and a combustion sustaining gas from the secondary tuyeres, respectively; and conducting melting while controlling the post combustion ratio of the gas by adjusting the amount of the combustion sustaining gas blown from the secondary tuyeres.

2. A method of melting tin-plated iron scrap as defined in claim 1, wherein the post combustion ratio of the gas is controlled to be higher than 10% and less than 50%.

3. A method of melting tin-plated iron scrap using a vertical furnace having an opening for charging materials and discharging gases to an upper portion of the furnace, and tuyeres in a furnace wall of the lower portion of the furnace and/or a furnace bottom, comprising:

forming a coke packed layer from the furnace bottom to a level including the tuyeres and an iron scrap packed layer thereabove, the iron scrap including non tin-plated iron scrap and tin-plated iron scrap, the iron scrap packed layer being formed by charging the tin-plated iron scrap before charging the non tin-plated iron scrap and the tin-plated iron scrap being maintained between the coke packed layer and the non tin-plated iron scrap layer; and blowing a combustion sustaining gas from the tuyeres.

4. A method of melting tin-plated iron scrap as defined in claim 3, wherein the vertical furnace includes secondary tuyeres in the furnace wall of an upper portion of the furnace, the method including blowing a combustion sustaining gas from the secondary tuyeres.

5. A method of melting tin-plated iron scrap as defined in claim 4, wherein melting is conducted while controlling the post combustion ratio of the gas by adjusting the amount of the combustion sustaining gas blown from the secondary tuyeres, the post combustion ratio of the gas being controlled to be higher than 10% and less than 50%.

6. A method of melting tin-plated iron scrap as defined in claim 1, wherein the coke packed layer has a bulk density of 0.8 to 1.0 t/m$^3$.

7. A method of melting tin-plated iron scrap as defined in claim 3, wherein the coke packed layer has a bulk density of 0.6 to 1.0 t/m$^3$.

8. A method of melting tin-plated iron scrap as defined in claim 1, wherein the iron scrap packed layer has a bulk density of 1.0 to 2.6 t/m$^3$.

9. A method of melting tin-plated iron scrap as defined in claim 3, wherein the iron scrap packed layer has a bulk density of 1.0 to 3.0 t/m$^3$.

10. A method of melting tin-plated iron scrap as defined in claim 1, wherein the iron scrap packed layer includes shredded tin-plated iron scrap.

11. A method of melting tin-plated iron scrap as defined in claim 3, wherein the iron scrap packed layer includes shredded tin-plated iron scrap.

12. A method of melting tin-plated iron scrap as defined in claim 1, wherein the iron scrap packed layer includes three-dimensionally deformed tin-plated iron scrap.

13. A method of melting tin-plated iron scrap as defined in claim 3, wherein the iron scrap packed layer includes three-dimensionally deformed tin-plated iron scrap.

14. A method of melting tin-plated iron scrap as defined in claim 1, wherein tin on the tin-plated iron scrap is oxidized by $CO_2$ and removed from the furnace as $SnO_2$ dust and/or vapor.

15. A method of melting tin-plated iron scrap as defined in claim 3, wherein tin on the tin-plated iron scrap is oxidized by $CO_2$ and removed from the furnace as $SnO_2$ dust and/or vapor.

16. A method of melting tin-plated iron scrap as defined in claim 1, wherein the tin-plated iron scrap has a Sn content of at least 0.1 wt %.

17. A method of melting tin-plated iron scrap as defined in claim 3, wherein the tin-plated iron scrap has a Sn content of at least 0.1 wt %.

18. A method of melting tin-plated iron scrap as defined in claim 3, wherein the furnace does not include secondary tuyeres.

19. A method of melting tin-plated iron scrap as defined in claim 3, wherein the furnace includes secondary tuyeres which are not operated during the melting of the iron scrap.

* * * * *